United States Patent
Matz et al.

(10) Patent No.: US 8,291,713 B2
(45) Date of Patent: Oct. 23, 2012

(54) METHOD OF OPERATING A GAS TURBINE POWER PLANT

(75) Inventors: Charles Matz, Neuenhof (CH); Bernhard Erb, Unterkulm (CH); Bikas Das Burma, Wettingen (CH); Luca Beresini, Sammjun-Compslsch (CH); Martin Heinrich Treiber, Zurich (CH); Peter Marx, Birmenstorf (CH)

(73) Assignee: ALSTOM Technology Ltd., Baden (CH)

( * ) Notice: Subject to any disclaimer, the term of this patent is extended or adjusted under 35 U.S.C. 154(b) by 522 days.

(21) Appl. No.: 12/238,770

(22) Filed: Sep. 26, 2008

(65) Prior Publication Data
US 2009/0071165 A1 Mar. 19, 2009

Related U.S. Application Data

(63) Continuation of application No. PCT/EP2007/052183, filed on Mar. 8, 2007.

(30) Foreign Application Priority Data

Mar. 27, 2006 (EP) .................................. 06111737

(51) Int. Cl.
*F02C 9/00* (2006.01)
(52) U.S. Cl. .......................................... 60/773; 60/778
(58) Field of Classification Search ............... 60/39.281, 60/773, 39.27; 415/27, 48, 49
See application file for complete search history.

(56) References Cited

U.S. PATENT DOCUMENTS

| 4,252,498 A | 2/1981 | Radcliffe et al. |
| 4,370,560 A * | 1/1983 | Faulkner et al. ............. 290/40 C |
| 4,536,126 A * | 8/1985 | Reuther ....................... 290/40 R |
| 5,042,245 A | 8/1991 | Zickwolf, Jr. |
| 2003/0011199 A1 | 1/2003 | Wickert et al. |

FOREIGN PATENT DOCUMENTS
WO WO2007/110308 10/2007

OTHER PUBLICATIONS

Search Report for European Patent App. No. 06111737.0 (Oct. 25, 2006).
Written Opinion of the International Searching Authority for PCT Patent App. No. PCT/EP2007/052183 (Jul. 16, 2007).

* cited by examiner

*Primary Examiner* — Ehud Gartenberg
*Assistant Examiner* — Vikansha Dwivedi
(74) *Attorney, Agent, or Firm* — Cermak Nakajima LLP; Adam J. Cermak

(57) ABSTRACT

In a method of operating a gas turbine during shut down, the gas turbine is decelerated and closure of compressor inlet guide vanes (1) is initiated at a shaft speed at least 5% above the shaft speed where a vibration peak occurs. The compressor inlet guide vanes (1) are closed by an angle in the range from 15°-35°, preferably at a rate between 5° and 10° per second. The method effects a reduction of the risk of rotational stall.

7 Claims, 2 Drawing Sheets

METHOD OF OPERATING A GAS TURBINE POWER PLANT

This application is a Continuation of, and claims priority under 35 U.S.C. §120 to, International application no. PCT/EP2007/052183, filed 8 Mar. 2007, and claims priority under 35 U.S.C. §§119, 365 therethrough to European application No. 06111737.0, filed 27 Mar. 2006, the entireties of which are incorporated by reference herein.

BACKGROUND OF THE INVENTION

1. Field of the Invention

The invention relates to a method of operating a gas turbine power plant and in particular to a method for the operation of the gas turbine power plant during plant shut down by regulating stator vanes of a multistage axial air compressor.

2. Brief Description of the Related Art

It is generally known that during the shut down of a gas turbine, compressor instabilities can occur. In particular, stalls can occur in the compressor once lower speeds are reached. Such stalls can give rise to vibrations of the airfoils and shaft, which potentially limit the operational lifetime or lead to compressor damage.

U.S. Pat. No. 5,042,245, for example, discloses compressor stall conditions as well as measures to prevent or limit such conditions by variation of the position of stator vanes. Maintaining that a setting of vane positions as a function of rotor speed leads to unsatisfactory operation, it presents in particular a method of positioning the stator vanes together with a regulation of compressor bypass valves. The method includes a feedback loop operating according to compressor pressure ratios, which are compared to a reference compressor ratio.

This method described above is particularly directed to the application to aircraft engines in connection with a closed or open loop control.

A method of operating gas turbines at partial load, as disclosed in U.S. Pat. No. 5,634,327, includes a reduction of fuel flow to two combustion chambers and an adjustment of compressor guide blade angles at the onset of load reduction until the load drops below 50% of the rated load. At loads below 50% of rated load the fuel flow is regulated according to mass flow and inlet temperatures to the turbines.

Low speed compressor instabilities during shut down of gas turbines can also include rotational stall, which occurs when one or more neighboring compressor blades stall before other neighboring blades. This condition can lead to a stalling of blades counter to the direction of rotation of the shaft and unstalling of blades in the direction of shaft rotation. This results in a stall cell rotating at approximately 50% of the shaft speed and can lead to high shaft vibrations peaks when the shaft imbalance caused by the stall conditions coincides with a critical eigenfrequency of the shaft.

SUMMARY

One of numerous aspects of the present invention includes a method of operating an industrial gas turbine 7 (see FIG. 2, including a compressor 4 having inlet guide vanes 1, a combustor 5, and a turbine 6, rotating on a shaft 8) that reduces or eliminates the risk of compressor instabilities during gas turbine shut down and in particular rotational stall at low compressor speeds.

Another of these aspects includes a gas turbine operated during gas turbine shut down according to the following steps:

1) as the gas turbine decelerates, initiating closure of the compressor inlet guide vane at a shaft speed at least 5% above the shaft speed where a rotational stall-induced vibration peak occurs, that is, when high shaft vibration peaks occur due to a coincidence of the shaft imbalance caused by a stall conditions with a critical eigenfrequency of the shaft.

2) close compressor inlet guide vane closure angle by an amount of 15-35°.

Exemplary methods according to the invention can effectively reduce rotating stall in industrial gas turbines to a level below where the compressor is no longer at risk to develop damage.

During a shut down according to an exemplary method, the compressor airfoils have an aerodynamic braking effect on the shaft, which results in a compressor pressure rise across the airfoil stages. Effectively, it is then the gas turbine shaft rotational energy that drives the compressor. Reducing the aerodynamic braking on the shaft during a shut down, i.e., closing the vanes as described in 1) and 2), results in a decrease of the transient compressor pressure ratio of inlet pressure to outlet pressure across the airfoils. As a result, the aerodynamic loading on the critical front stages of the compressor, that are subject to rotating stall, reduces significantly. This reduces the susceptibility of the airfoils to rotating stall, which in turn can significantly reduce shaft vibrations induced by the large asymmetry within the compressor flow field associated with rotating stall.

The shut down of a gas turbine according to this method has the further beneficial effect, that the increased mass flow resulting from allowing the vanes to remain open for a longer period of time during the shut down causes an increased convective cooling of the flow path and metal parts and, in particular, of the turbine disks. This in turn effects a decrease of vibrations.

In a particular exemplary method according to the invention, the angle of the inlet guide vanes is closed in step 2) at a rate of 5-10° per second. Where the point of onset of closure of the inlet guide vanes and the degree of total closure primarily effects the reduction of rotational stall, the rate of closure further contributes to this effect.

In a further particular method according to the invention, the closure of the inlet guide vane angles is initiated at a shaft speed 5-10% of the speed above the shaft speed where the vibration peak occurs.

In a further particular method according to the invention, the closure of the inlet guide vane angles is initiated at a shaft speed 10-15% of the speed above the shaft speed where the vibration peak occurs.

BRIEF DESCRIPTION OF THE DRAWINGS

The invention will now be described in more detail with reference to exemplary embodiments of the apparatus and method, given only by way of example, and with reference to the accompanying drawings, in which.

DETAILED DESCRIPTION OF EXEMPLARY EMBODIMENTS

In an exemplary method embodying principles of the invention, the gas turbine is decelerated from full speed. At a shaft speed 5%, preferably 10%, above the shaft speed where a vibration peak occurs, closure of the inlet guide vanes is initiated. The speed at which closure is initiated is, for example, at a speed in the range between 44% and 60% of the full shaft speed, where the actual speed depends on the ambient air temperature and the type of gas turbine. In one particular example the onset is at 48% of the full shaft speed. Preferably, the onset of closure should be as late as possible, however prior to entering the stall regime. Effectively, the closure should be initiated such that closure of the vanes is complete before the critical speed is reached at which rotational stall can occur.

For the closure of the inlet guide vanes, the guide vanes of the first stage or first stages of the compressor are rotated from initial position before rotor deceleration such that the chord angle increases. The chord angle is the angle between a line connecting leading and trailing edges of a vane and the turbine axis. At initial position before rotor deceleration, this angle is, for example, $-45°$. This angle is then closed, for example, to an angle of $-60°$.

In a further example of the method, the closure angle is closed by an amount up to 35° with a final closure angle from $-75°$ to $-80°$.

Figure 1A:
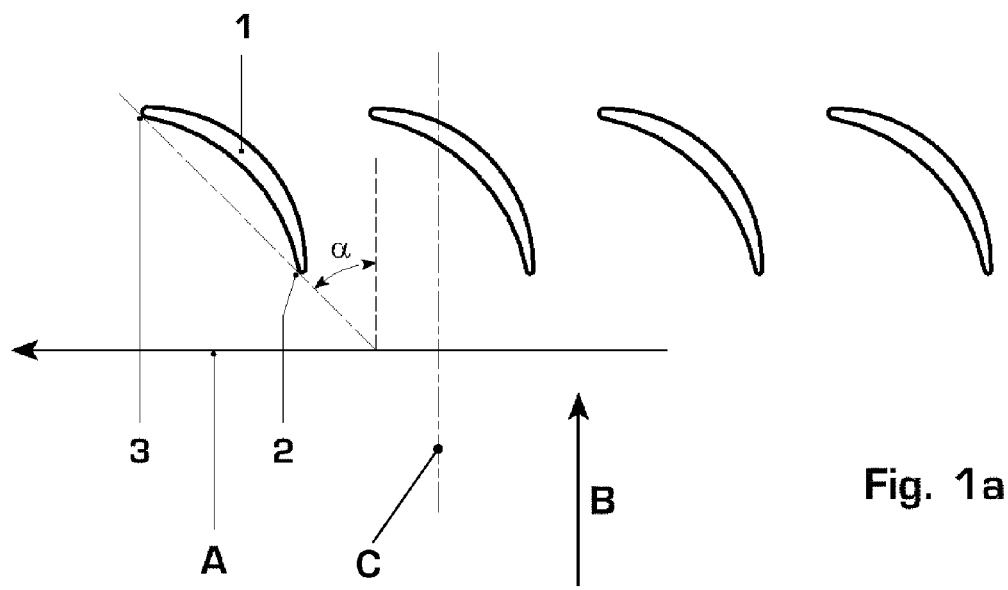
FIG. 1a shows an exemplary part of an inlet guide vane row of a compressor in the nominal position.
Figure 1B:
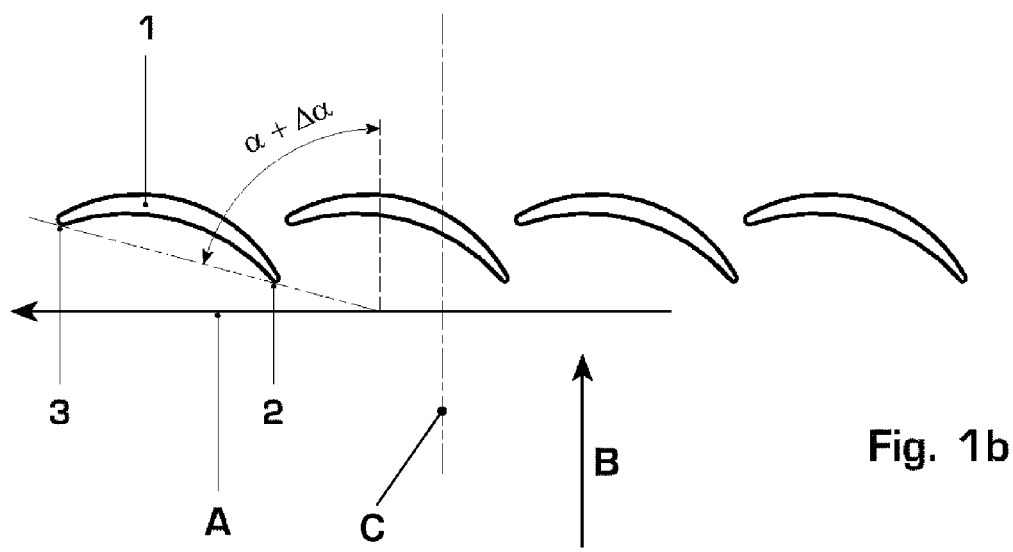
FIG. 1b shows the same inlet guide vane row as in FIG. 1a in a closed position relative to the nominal after closing according to the method according to the invention.
Figure 2:
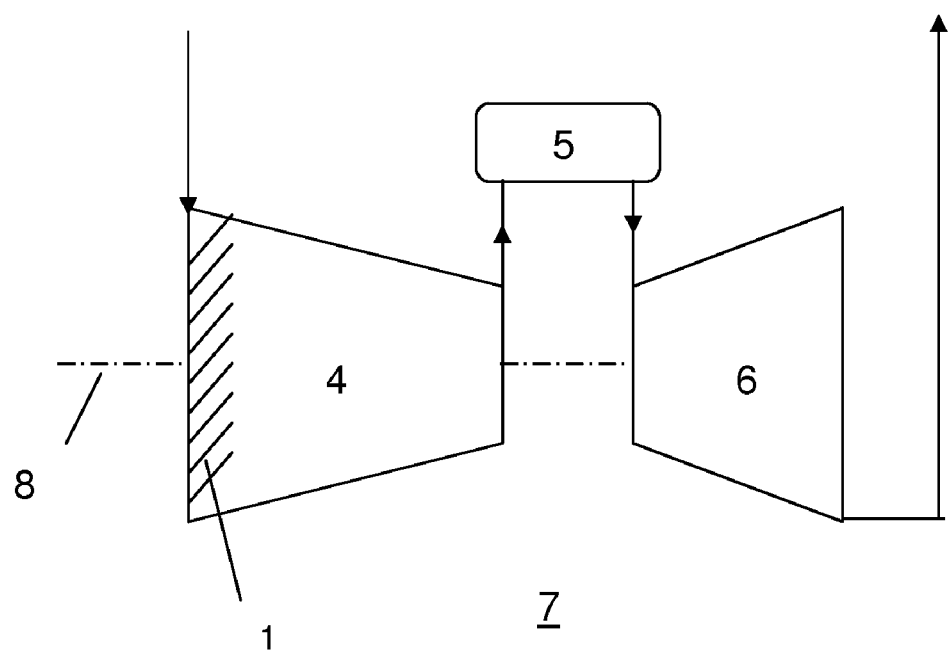
FIG. 2 illustrates an industrial gas turbine.

FIG. 1a and 1b show inlet guide vanes 1 in a guide vane row of a compressor rotating in the direction indicated by the arrow A. The arrow B indicates the airflow through the compressor. Each vane has a leading edge and trailing edge 2, 3. The chord angle $\alpha$ is the angle between the line from leading to trailing edge and the turbine axis C. FIG. 1a shows the initial position of the guide vanes for example with $\alpha=-45°$ and FIG. 1b shows a position at $\alpha=-60°$ after closure by $\Delta\alpha=15°$.

Depending on the type of compressor, this closure of the guide vanes is applied for example to the first stage, two first stages, or three first stages of the compressor.

For a yet greater reduction of the risk of rotating stall, the closure rate is increased compared to the closure rate in operating methods of the prior art. The closure is performed as fast as possible and within the mechanical limits. In a first example, the closure rate is in the range from 5-10° per second. In a further example, the closure rate is in the range from 8-10° per second.

The rapid closure of the inlet guide vanes just prior to reaching the rotating stall regime (at a rotor speed approximately 10-15% above the shaft speed where the vibration peak occurs) reduces or eliminates the high vibrations that occur when the shaft imbalance caused by the stall conditions coincides with a critical eigenfrequency of the shaft.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of operating a gas turbine during shut down of the gas turbine, the gas turbine including a compressor having inlet guide vanes and a shaft, the shaft having a shaft speed at which a vibration peak occurs, the method comprising:
    decelerating the compressor while the inlet guide vanes remain open until initiating closure of compressor inlet guide vanes at a shaft speed 5%-10% higher than said shaft speed at which said vibration peak occurs, including closing the compressor inlet guide vanes by an angle $\Delta\alpha$ in the range from 15°-35° and at a closure rate of 5°-10° per second.

2. A method of operating a gas turbine according to claim 1, wherein closing the inlet guide vanes is performed at a rate of 8°-10° per second.

3. A method of operating a gas turbine according to claim 1, comprising:
    closing the compressor inlet guide vanes from an initial angle $\alpha$ of $-45°$ to a final angle $\alpha+\Delta\alpha$ of $-60°$.

4. A method of operating a gas turbine according to claim 1, comprising:
    closing the compressor inlet guide vanes from an initial angle $\alpha$ of $-45°$ to a final angle $\alpha+\Delta\alpha$ of $-75°$ to $-80°$.

5. A method of operating a gas turbine according to claim 1, wherein initiating the closure of the compressor inlet guide vanes comprises initiating closure at a shaft speed in the range from 44% to 60% of the full shaft speed.

6. A method of operating a gas turbine according to claim 5, wherein initiating the closure of the compressor inlet guide vanes comprises initiating closure at a shaft speed 48% of the full shaft speed.

7. A method of operating a gas turbine according to claim 1, further comprising:
    closing the inlet guide vanes completely before a shaft speed is reached where a vibration peak occurs.

* * * * *